Figure 6:
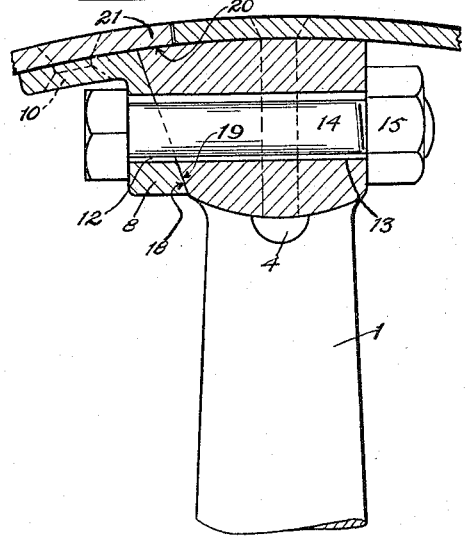

J. A. BRIED.
RIM FASTENING FOR SPLIT PULLEYS.
APPLICATION FILED JULY 24, 1915.
1,169,233.
Patented Jan. 25, 1916.
2 SHEETS—SHEET 1.
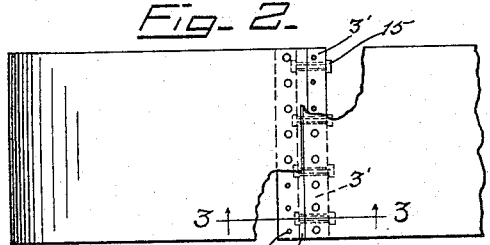
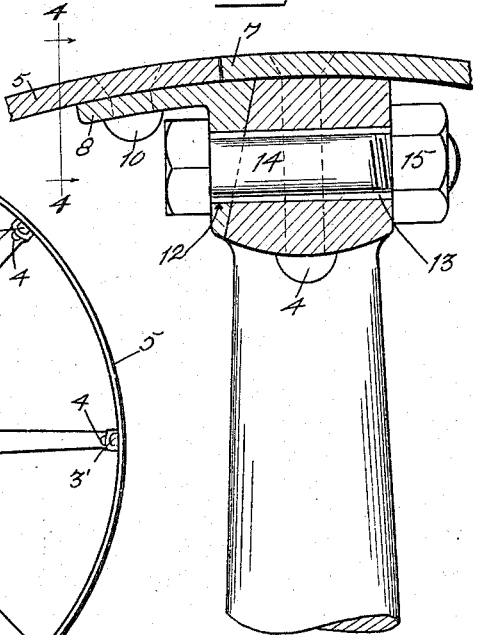
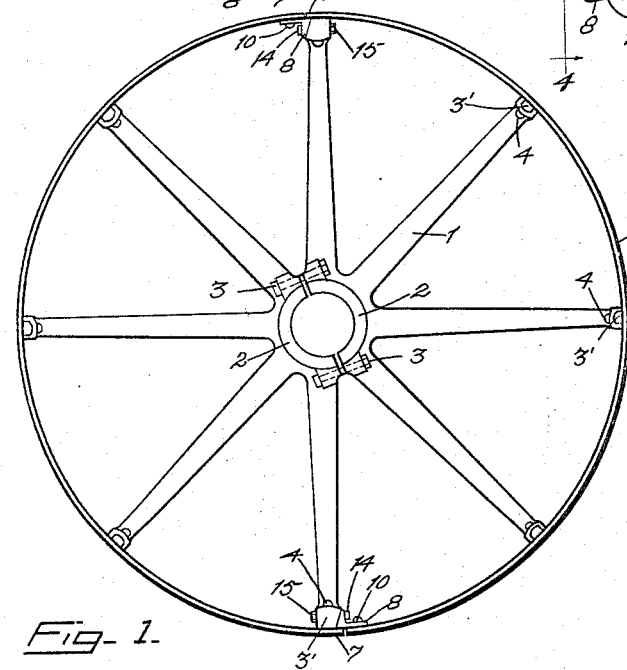
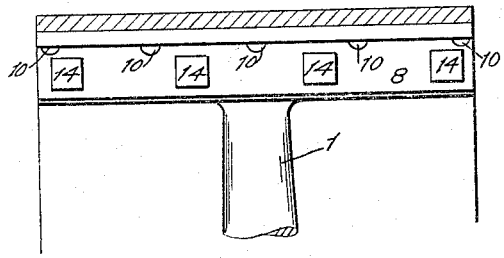
INVENTOR
Julien A. Bried
BY
ATTORNEYS

J. A. BRIED.
RIM FASTENING FOR SPLIT PULLEYS.
APPLICATION FILED JULY 24, 1915.

1,169,233.

Patented Jan. 25, 1916.
2 SHEETS—SHEET 2.

WITNESS

INVENTOR
Julien A. Bried
BY
ATTORNEYS

UNITED STATES PATENT OFFICE.

JULIEN A. BRIED, OF OAKLAND, CALIFORNIA.

RIM-FASTENING FOR SPLIT PULLEYS.

1,169,233.  Specification of Letters Patent.  Patented Jan. 25, 1916.

Application filed July 24, 1915. Serial No. 41,677.

*To all whom it may concern:*

Be it known that I, JULIEN A. BRIED, a citizen of the United States, residing at Oakland, in the county of Alameda and State of California, have invented certain new and useful Improvements in Rim-Fastenings for Split Pulleys, of which the following is a specification.

Divided pulleys have heretofore been united at the rim by suitable angle members connected by bolts or the like, and which are positioned intermediate to the spokes of the wheel. The assembling of these structures requires great care in maintaining perfect alinement of the rim and obtaining a tight joint between the rim sections, and in structures of this type, when rotated at high speed, the outward pressure on the rim at the connected joint occasioned by the centrifugal force of the rotation of the pulley at high speed, causes the unsupported joint to break and the pulley to fly apart, causing great damage.

The present invention has for its principal object to overcome the objections present in the divided pulleys now universally in use, and to provide one wherein a support is provided for the joined ends of the rim; one which is capable of being easily and quickly assembled or dismantled, and which does not require the services of a skilled mechanic in so doing; and one in which the joint union of the rim sections is located in close proximity to the supporting spokes, thereby overcoming the bulging of the pulley on the rotation of the same at high speed, and one whereby the surfaces of the coöperating rim sections are forced into alinement on the making of the joint union therebetween.

The invention consists broadly in dividing the pulley rim transversely and preferably at a point adjacent opposite spokes and attaching to the free end of the rim an angle iron or other suitable portion, securing the angle iron or other suitable portion to the spoke by any suitable means which will draw the ends of the rim together and aline its surfaces.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in side elevation of a divided pulley with an embodiment of my invention uniting the sections. Fig. 2 is a view in elevation of the pulley partly broken away, disclosing the angle iron carried by the free portion of the rim, the flanged extension on the spoke and the bolts uniting the members together. Fig. 3 is a sectional view taken on line 3—3 of Fig. 2, disclosing the beveled joint between the angle iron and spoke. Fig. 4 is a transverse sectional view taken on line 4—4 of Fig. 3. Fig. 5 is a transverse sectional view of a pulley having a crown face, disclosing the angle members formed in sections. Figs. 6, 7, 8 and 9 are views in sections of several forms of structures, wherein the joint is a slight departure from the preferred form.

Referring more particularly to the several views of the drawings, wherein like characters of reference designate corresponding parts—1 indicates the spokes of a pulley radiating from a divided hub 2, the sections of which are joined together by the bolts 3 which may also assist in clamping the hub about its supporting shaft. The spokes 1 and hub 2 are preferably of cast metal and extending from the opposite sides of the end of the spokes are the integral laterally extending spoke flanges 3', to which are secured, preferably by the rivets 4, the steel rim 5, which is preferably divided transversely on the opposite sides of the ends of certain diametrically opposite spokes to enable the pulley to be clamped about a shaft and to provide a balanced structure. For clearness, the spoke flanges are hereinafter included in the spokes in the remainder of the specifications and in the claims.

In the preferred form, the coöperating faces of certain diametrically opposite spokes lie in a plane parallel to the axis of the pulley and converge outwardly with the radius of the spoke. The portion of the rim 5 secured to the beveled spokes overhangs the beveled surface forming a lip 7 which provides an abutment or stop for the angle irons or flanges 8 secured by rivets 10 to the free portions of the rim and extending preferably for the full length thereof. Suitable apertures 12 and 13 are formed respectively in the angle iron and spoke, and through the same extend the bolts 14, preferably of a diameter smaller than the apertures. Suitable nuts 15 fitted to the bolts draw the beveled faces of the angle irons against the beveled faces of the spokes, and in so doing force the upper surface of the angle iron beneath and tightly in contact with the under surface of the overhang or lip 7 of the rim and draw the coöperating edges of the rim toward each other with the outer surfaces thereof in alinement. In this construction it is only necessary in clamping the pulley around a shaft to properly assemble the same and the tightening of the nuts 15 will automatically draw the beveled edges and angle irons together against each other and the angle of the bevel will tightly force the upper surface of the angle iron against the under surface of the overhang or lip 7. The clamping action in this structure is approximately at right angles to the centrifugal force of the wheel when revolving, and at a point where the spokes form one member, and the overhang or lip 7 provides a stop or retaining means for the outward tendency of the angle iron.

In Fig. 5 the angle iron instead of being continuous is formed in a plurality of sections 16 which are secured to the rim by the rivets 10 and such structure is particularly adapted for pulleys having crowned surfaces, as it obviates the necessity of forming continuous angles to the crown of the pulley.

In the form disclosed in Fig. 6 the coöperating faces of the flange and spoke are beveled outwardly in a direction from the outer central portion of the spoke, as at 18 and 19, and the portion of the rim secured to the spoke terminates short of the side edge thereof providing a seat 20 on which is adapted to rest the overhanging portion 21 of the rim projected beyond the face of the flange. In assembling this structure the tightening of the nut 15 draws the beveled face 18 of the flange downwardly on the beveled face 19 of the spoke and seats the overhanging portion 21 of the rim on the seat 20, thus alining the coöperating ends of the rim.

Figure 7:
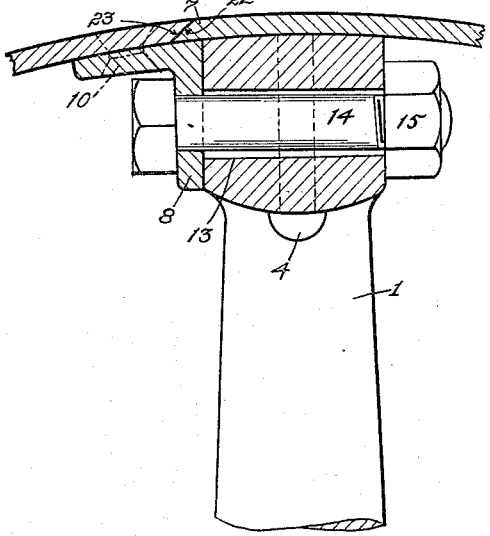

In Fig. 7 the construction is substantially the same as in the preferred form with the exception that the coöperating faces of the spoke and angle iron are arranged in a plane parallel to the center line of the spoke and the meeting edges of the rim are formed with coöperating beveled surfaces 22 and 23 and the action thereof, when drawn together by the nut 15, is to aline the rim sections and draw the angle iron tightly against the undersurface of the overhanging portion of the rim secured to the spoke.

Figure 8:
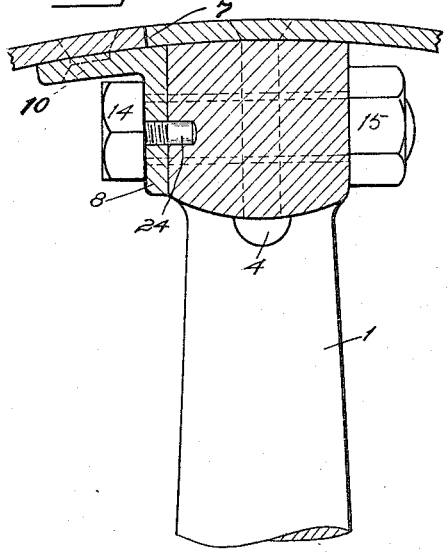
Figure 9:
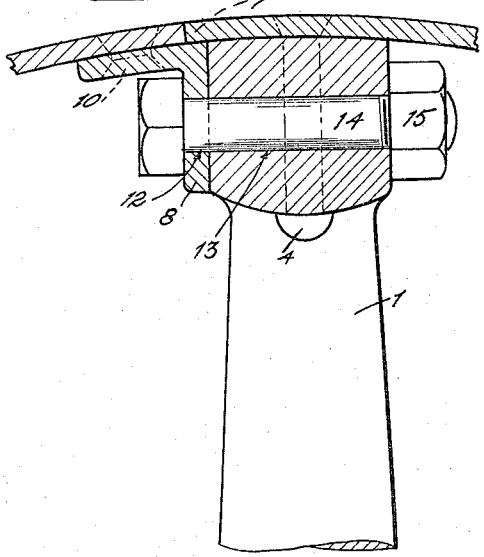

The structures disclosed in Figs. 8 and 9 are very similar with the exception that in the structure in Fig. 9 the retaining bolt fits snugly into the apertures formed in the angle iron and spoke and these apertures are bored or machined in such manner as to insure an exact alining of the meeting ends of the sections, and in Fig. 8 the retaining bolt fits loosely into the apertures, and dowels 24 guide the parts into their proper position with the coöperating end sections of the rim in alinement.

In the various forms of the invention it will be apparent that the rim joint is made adjacent a spoke and that the free end of the rim carries an angle iron which is clamped to the side of the spoke. It will also be apparent that there is provided in each form an overhanging or projecting rim portion forming a stop which overhangs the opposing clamping member, and in each form when the adjacent rim sections are secured in position the outer surfaces thereof will lie in alinement.

Having thus described the invention, I claim:—

1. A joint for divided pulleys comprising rim supporting spokes, a divided rim, the coöperating ends of which terminate adjacent to one of the rim supporting spokes, and one of said ends overhanging the side face of said spoke, an attaching means carried by the coöperating end projecting beyond the end thereof for engagement under the overhanging end secured to said spoke, and means for detachably securing said attaching means to said spoke.

2. A joint for divided pulleys comprising rim supporting spokes, coöperating rim sections, the coöperating ends of certain of said sections terminating adjacent to one of the rim supporting spokes and the end of one of said coöperating sections overhanging the side face of said spoke and secured thereto, an attaching member secured to the other of said coöperating rim sections and projecting beyond the end thereof and adapted when in position to engage under the overhanging portion of said coöperating rim sections and means for detachably securing said attaching member to said spoke with the coöperating ends of the rim sections in substantial meeting relation, and the meeting edges of said rim being in staggered relation to the meeting surfaces of said attaching member and spoke.

3. A joint for divided pulleys comprising rim supporting spokes, coöperating rim sections with the coöperating ends of certain of said sections terminating adjacent to one of the rim supporting spokes and the end of one of said coöperating sections secured to said spoke, an attaching member carried by the end of the other coöperating rim section for engaging the side face of the spoke, the engaging faces of the attaching member and spoke being correspondingly beveled to aline the outer surface of the rim sections when drawn together, and means for detachably securing the attaching member to the spoke with their faces in meeting relation.

4. A joint for divided pulleys comprising rim supporting spokes, a rim divided into sections with the ends of the sections terminating adjacent to certain of the rim supporting spokes and certain ends of said sections secured to said spokes, an attaching member carried by the other end of said sections for engaging the side faces of the spoke to which the end of a coöperating section is secured, the engaging faces of said attaching member and coöperating spoke lying in a plane parallel to the axis of the pulley and converging outwardly with the radius of the said spoke, and means for detachably securing said attaching member to its coöperating spoke.

In testimony whereof I have signed my name to this specification in the presence of a subscribing witness.

JULIEN A. BRIED.

Witness:
D. B. RICHARDS.

Copies of this patent may be obtained for five cents each, by addressing the "Commissioner of Patents, Washington, D. C."